Dec. 30, 1952     K. ROSETZ     2,623,625
CONVEYING DEVICE
Filed Aug. 19, 1950
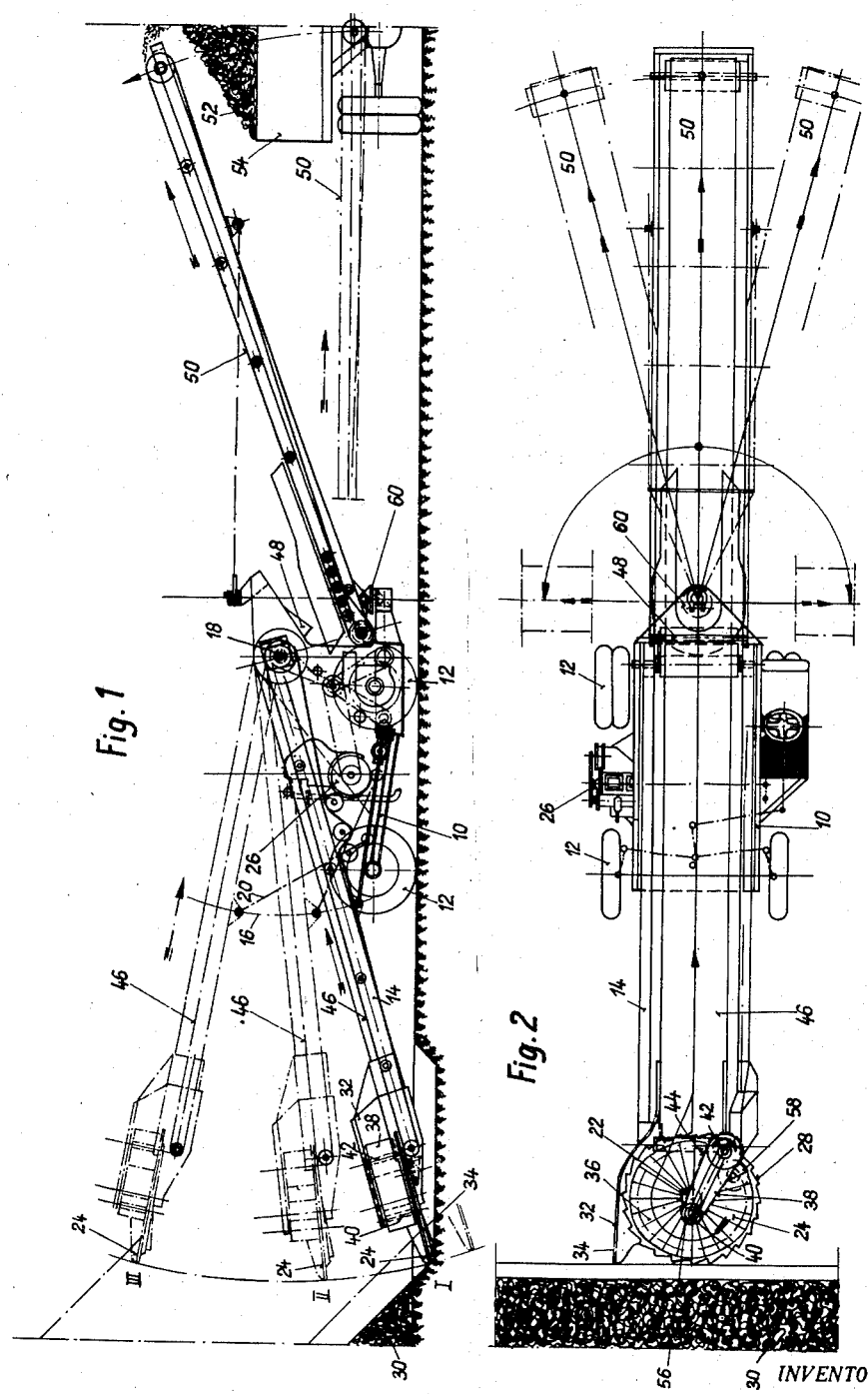
INVENTOR.
KURT ROSETZ
BY Patented Dec. 30, 1952

2,623,625

UNITED STATES PATENT OFFICE 2,623,625

CONVEYING DEVICE

Kurt Rosetz, Berlin-Wittenau, Germany

Application August 19, 1950, Serial No. 180,436
In Germany August 29, 1949

7 Claims. (Cl. 198—9)

The present invention relates to a conveying device adapted for handling a pile of material such as loose material, for instance coal, ore, gravel, sand, or briquettes. The conveying device according to the present invention is also suitable for handling farm products such as potatoes, beets and the like.

It is an object of the present invention to provide a device which conveys material in a uniform manner.

It is another object of the present invention to provide a device which conveys material in a continuous manner.

It is a further object of the present invention to provide a conveying device which avoids frequent intervals of time during which no material or little material is conveyed.

It is still another object of the present invention to provide a conveying device in which periodical changes of the conveying output are avoided.

The present invention comprises in its broadest aspect a scoop-like disc adapted to enter the material to be conveyed, a central axle for said disc and carrying the same, an internally toothed rim portion rigidly connected to one side of said disc near the perimeter thereof, and means engaging said rim portion for driving said disc, whereby the material is continuously taken up and conveyed.

Preferably the internally toothed rim portion is connected to the lower side of the disc.

In a preferred embodiment of the present invention a pinion engages the toothed rim portion and means are provided for driving the pinion at varying speeds.

Preferably the axle is connected to the disc so that the latter can be exchanged.

In a preferred embodiment of the present invention a plurality of teeth are arranged on the perimeter of the disc and protrude substantially in the plane thereof. Preferably the teeth are exchangeably arranged on the disc.

In a preferred embodiment of the present invention a plurality of corrugations such as flutes, grooves, recesses or the like are arranged on the upper side of the disc so that the material is conveyed by the corrugations under the weight of the material and the friction thereof with the disc. Preferably the corrugations are arranged substantially radially on the disc.

In a preferred embodiment of the present invention an endless belt is arranged substantially radially on the upper side of the disc and means are provided for continuously driving the endless belt. Thus the material conveyed by the disc is shifted by the endless belt off the disc.

In a preferred embodiment of the present invention conveying means are arranged with one end thereof underneath the disc substantially in alignment with one end of the endless belt so that the material driven off the disc by the endless belt is taken up and conveyed by the conveying means.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side elevation of a conveying device according to the present invention for delivering coal or the like shown at the left to a wagon shown at the right; and Fig. 2 is a plan view of the device shown in Fig. 1.

Referring now to the drawings the conveying device comprises a carriage 10 running on wheels 12 by which it can be moved lengthwise and rotated sideways. The carriage 10 carries on its front side a cantilever 14 which can be turned through a vertical angle 16 about a pivot 18 carried by the carriage 10. The adjustment of the cantilever 14 at different heights such as I, II, and III in Fig. 1 is done by a rope or chain 20 which is of conventional type and operated by the driver of the conveying device. One end of the rope or chain 20 is connected to a projection 14' of the cantilever 14 and the rope or chain 20 passes, for instance, over several pulleys such as 20'. The other end of the rope or chain 20 is attached to a drum 26' arranged coaxially to a motor 26 and being connected to the same by a coupling (not shown) operable by the driver.

The cantilever 14 carries at its front end opposite to the pivot 18 an axle 22 which carries a preferably exchangeable disc 24. The disc is rotated by the axle 22 which is driven in a manner more fully described hereinafter by the motor 26 arranged on the carriage 10. The disc 24 is provided with a plurality of teeth such as 28 arranged on the perimeter of the disc and protruding substantially in the plane thereof. The teeth 28 are preferably exchangeably connected to the disc 24 since they are subject to a larger tear and wear than the body of the disc. The teeth 28 have an unsymmetrical shape as shown in Fig. 2 and cut into the material 30 to be conveyed when the device is put with the disc close to the material. It should be understood that the disc rotates in a clockwise rotation with respect to Fig. 2. A protecting sheet 32, preferably of metal, is provided on the side of the disc leaving the material 30. The metal sheet 32 is provided with a horizontal portion 34 being arranged at a lower level than the disc 24 so that any material falling off the disc 24 is collected by the portion 34.

The disc 24 is provided with corrugations such as flutes, grooves, recesses or the like arranged on the upper side of the disc. In the drawings radial corrugations 36 are shown. These corrugations prevent a falling off of the material from the disc 24 if the disc is in an inclined position such as shown at I, in Fig. 1.

Above the disc 24 an endless belt 38 is arranged which runs in a substantially radial direction with respect to the disc 24 about two axles 40 and 42. The axle 42 is driven in a conventional manner from the motor 26 of the vehicle in a manner not indicated in the drawings. Preferably the endless belt 38 is provided on its outside with pegs 44 or the like which shift the material from the disc 24. It will be seen that the belt 38 reaches as far as the perimeter of the disc 24.

The material which falls off the disc 24 drops on a first conveyor belt 46 which is carried by the cantilever 14 and is substantially parallel to the plane of the disc 24 and conveys the material to a delivery chute 48 which is arranged above one end of a second conveyor belt 50 which can be adjusted at different angles as shown in Fig. 1 according to the level of the material 52 in the wagon 54 or the like to be filled. It should be understood that the wagon 54 is only shown by way of example and could be replaced by an immobile device. The endless belt 50 is driven by the motor 26 in a conventional manner and arranged with its end situated underneath the delivery chute 48 on a rotating disc 60 by means of which it can be brought to different angular positions as shown in Fig. 2. The disc 24 is driven by means of an internally toothed rim portion 56 rigidly connected to the lower side of the disc near the perimeter thereof. The toothed rim portion 56 is in engagement with a pinion 58 which can be driven by the motor 26 by any conventional means at varying speeds which can be controlled by the driver from his seat.

The operation of this device is as follows:

The material 30 is piled in a heap and is to be transferred to the wagon 54 or the like. In order to accomplish this device according to the invention is brought with the disc 24 near the material 30 as shown at II in Fig. 1 which indicates the position of the device during transport. The disc is then lowered into position I by means of the rope or chain 20 which moves the cantilever 14 carrying the disc 24 and the parts related thereto such as the first conveyor belt 46. The disc is then rotated by means of the rim portion 56 and the pinion 58 at a suitable speed and cuts into the material 30 by means of the circumferential teeth 28 so that part of the material is conveyed by the disc 24 to a rear position thereof at which it is caught by the endless belt 38 and the pegs 44 thereof and dropped on the first conveyor belt 46 which leads into the delivery chute 48 from which it passes through the second conveyor belt 50 which delivers it to the heap of material 52.

The device according to the present invention can also be used for removing gang trenches in coal mining for which the cantilever 14 with the disc 24 and the first conveyor belt is brought into the required position such as that indicated by I or III in Figure 1.

It will be understood that each of the elements described above, or two or more together, may also find a useful application in other types of conveying devices differing from the types described above.

While the invention has been illustrated and described as embodied in a conveying device adapted for handling a pile of material, it is not intended that the present invention be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A conveying device adapted for handling a pile of material comprising in combination, a scoop-like disc adapted to enter the material to be conveyed; a plurality of teeth arranged on the perimeter of said disc and protruding substantially in the plane thereof; a plurality of corrugations arranged on the upper side of said disc; a central axle for said disc and carrying the same; an internally toothed rim portion rigidly connected to the lower side of said disc near the perimeter thereof; and means engaging said rim portion for driving said disc, whereby the material is continuously taken up by said teeth and conveyed by said corrugations under the weight of the material and the friction thereof with said disc.

2. A conveying device adapted for handling a pile of material comprising in combination, a scoop-like disc adapted to enter the material to be conveyed; a plurality of teeth arranged on the perimeter of said disc and protruding substantially in the plane thereof; a plurality of corrugations arranged substantially radially on the upper side of said disc; a central axle for said disc and carrying the same; an internally toothed rim portion rigidly connected to the lower side of said disc near the perimeter thereof; and means engaging said rim portion for driving said disc, whereby the material is continuously taken up by said teeth and conveyed by said corrugations under the weight of the material and the friction thereof with said disc.

3. A conveying device adapted for handling a pile of material comprising in combination, a scoop-like disc adapted to enter the material to be conveyed; a plurality of teeth arranged on the perimeter of said disc and protruding substantially in the plane thereof; a plurality of corrugations arranged on the upper side of said disc; a central axle for said disc and carrying the same; an endless belt arranged substantially radially on the upper side of said disc; means for continuously driving said endless belt; an internally toothed rim portion rigidly connected to the lower side of said disc near the perimeter thereof; and means engaging said rim portion for driving said disc, whereby the material is continuously taken up by said teeth and conveyed by said corrugations under the weight of the material and the friction thereof with said disc, the material being shifted by said endless belt off said disc.

4. A conveying device adapted for handling a pile of material comprising in combination, a scoop-like disc adapted to enter the material to be conveyed; a plurality of teeth arranged on the perimeter of said disc and protruding substantially in the plane thereof; a plurality of corrugations arranged substantially radially on the upper side of said disc; a central axle for said disc and carrying the same; an endless belt arranged substantially radially on the upper side of said disc; means for continuously driving said endless belt; an internally toothed rim portion rigidly connected to the lower side of said disc near the perimeter thereof; and means engaging said rim portion for driving said disc, whereby the material is continuously taken up by said teeth and conveyed by said corrugations under the weight of the material and the friction thereof with said disc, the material being shifted by said endless belt off said disc.

5. A conveying device adapted for handling a pile of material, comprising in combination, a scoop-like disc adapted to enter the material to be conveyed; a plurality of teeth arranged on the perimeter of said disc and protruding substantially in the plane thereof; a plurality of corrugations arranged on the upper side of said disc; a central axle for said disc and carrying the same; an internally toothed rim portion rigidly connected to one side of said disc near the perimeter thereof; and a pinion engaging said rim portion for driving said disc, whereby the material is continuously taken up and conveyed by said corrugations under the weight of the material and the friction thereof with said disc.

6. A conveying device adapted for handling a pile of material, comprising in combination, a scoop-like disc adapted to enter the material to be conveyed; a plurality of teeth arranged on the perimeter of said disc and protruding substantially in the plane thereof; a plurality of corrugations arranged on the upper side of said disc; a central axis for said disc and carrying the same; an internally toothed rim portion rigidly connected to one side of said disc near the perimeter thereof; a pinion engaging said rim portion for driving said disc; and means for driving said pinion at varying speeds, whereby the material is continuously taken up and conveyed by said corrugations under the weight of the material and the friction thereof with said disc.

7. A conveying device adapted for handling a pile of material, comprising in combination, a scoop-like disc adapted to enter the material to be conveyed; a plurality of teeth arranged on the perimeter of said disc and protruding substantially in the plane thereof; a plurality of corrugations arranged on the upper side of said disc; a central axle connected to said disc and carrying the same so that said disc can be exchanged; an internally toothed rim portion rigidly connected to one side of said disc near the perimeter thereof; a pinion engaging said rim portion for driving said disc; and means for driving said pinion at varying speeds, whereby the material is continuously taken up and conveyed by said corrugations under the weight of the material and the friction thereof with said disc.

KURT ROSETZ.

REFERENCES CITED

The following references are of record in the file of this patent:

UNITED STATES PATENTS

| Number | Name | Date |
| --- | --- | --- |
| 839,997 | Holmested | Jan. 1, 1907 |
| 944,438 | Holmested | Dec. 28, 1909 |
| 981,201 | Kuhn | Jan. 10, 1911 |
| 1,061,778 | Powell | May 13, 1913 |
| 1,473,365 | Vogel | Nov. 6, 1923 |
| 1,752,714 | Wilcox | Apr. 1, 1930 |